United States Patent Office 3,719,527
Patented Mar. 6, 1973

3,719,527
THERMAL BATTERY
Ronald W. Carlsten and Donald A. Nissen, Albuquerque, N. Mex., assignors to the United States of America as represented by the United States Atomic Energy Commission
Filed Jan. 31, 1972, Ser. No. 222,029
Int. Cl. H01m 21/14
U.S. Cl. 136—83 T                           8 Claims

ABSTRACT OF THE DISCLOSURE

A thermal battery activatable above a preselected temperature including a casing with a plurality of electrochemical cells therein, each of which includes a halide cathode and a solid electrolyte having substantially greater conductivity after a phase transition, and an anode separated from the cathode by an electrolyte; means are provided in the casing for heating the cells to temperature and initiating the heating means to activate the battery.

BACKGROUND OF INVENTION

Thermal batteries are often used as power sources in applications where reserve batteries having long shelf life are required. Such batteries utilize electrochemical cells which are activated by heat to produce electricity. These prior cells generally included suitable anode and cathode elements separated by an electrolyte which is solid and non-conducting at normal or ordinary operating temperatures. When the battery cells are heated to the melting temperature of the electrolyte, the electrolyte may fuse or melt and become conductive, permitting the battery to function and produce electricity by well known electrochemical reactions.

These prior thermal batteries have certain inherent limitations and disadvantages. For example, the thermal batteries often require very high temperatures to produce an significant current output, generally from 400 to 600° C. Such temperatures often require provision of a very high temperature heat source in the battery and consequently extensive thermal insulation to contain and maintain this temperature. These aspects may result in additional design restraints on the battery package and materials. Since these batteries generally require an electrolyte which is normally solid at room temperature and becomes liquid at the operating temperature of the battery, the electrolyte may require the use of stabilizing binders to maintain the electrolyte in proper position in the battery cells and possibly also require sealing elements or very close tolerances to prevent leakage of the liquid electrolyte around the ends of the cells. Also, this type of electrolyte is generally hygroscopic in nature and thus requires that fabrication of the battery cells be done in an atmosphere where humidity is rigidly controlled.

In spite of these problems, thermal batteries are very useful in applications which require long shelf life where the battery remains completely inactive until a specific activating pulse or some desired environmental condition or event occurs which initiates battery operation. When the thermal battery is activated, it is desired that it provide as high a level of power as possible in a given battery volume and weight, especially for applications requiring minimization of such parameters, at as low a temperature above normal ambient temperatures as possible. Further, thermal batteries with pelletized construction may provide ease of fabrication and a ruggedness and resistance to shocks and other adverse environmental conditions which are also desirable in many of these applications.

Prior solid electrolyte batteries have generally been limited to current of less than 35 milliamps per square centimeter of electrode area. Generally, with these prior solid electrolyte and thermal batteries, the higher the battery operating temperature, the higher the current density produced.

SUMMARY OF INVENTION

In view of the above, it is an object of this invention to provide an improved thermal battery utilizing an electrolyte which remains solid at all operating temperature of the battery.

It is a further object of this invention to provide a thermal battery which is operable at lower temperatures and with higher current densities for longer periods of time than previously.

It is a further object of this invention to provide an improved thermal battery in which there is virtually no chemical interaction between electrolyte and the negative electrode and in which there is virtually no chemical interaction with moisture.

Various other objects and advantages will appear from the following description of the invention and the most novel features will be particularly pointed out hereinafter in connection with the appended claims. It will be understood that various changes in the details, materials and arrangements of parts, which are herein described and illustrated in order to explain the nature of the invention may be made by those skilled in the art within the principles and scope of this invention.

This invention comprises a thermal battery utilizing halide cathodes having a halogen releasable from the cathode at temperatures above a desired operating temperature, solid electrolytes which exhibit a phase transition at a temperature no greater than the desired operating temperature with substantially greater conductivity after the phase transition, and anodes separated from the cathodes by the electrolyte and reactable with the halogen, means for heating the battery to the desired operating temperature, and means for initiating the heating means.

DESCRIPTION OF DRAWING

The invention is illustrated in the accompanying drawing wherein.

DETAILED DESCRIPTION

Figure 1:
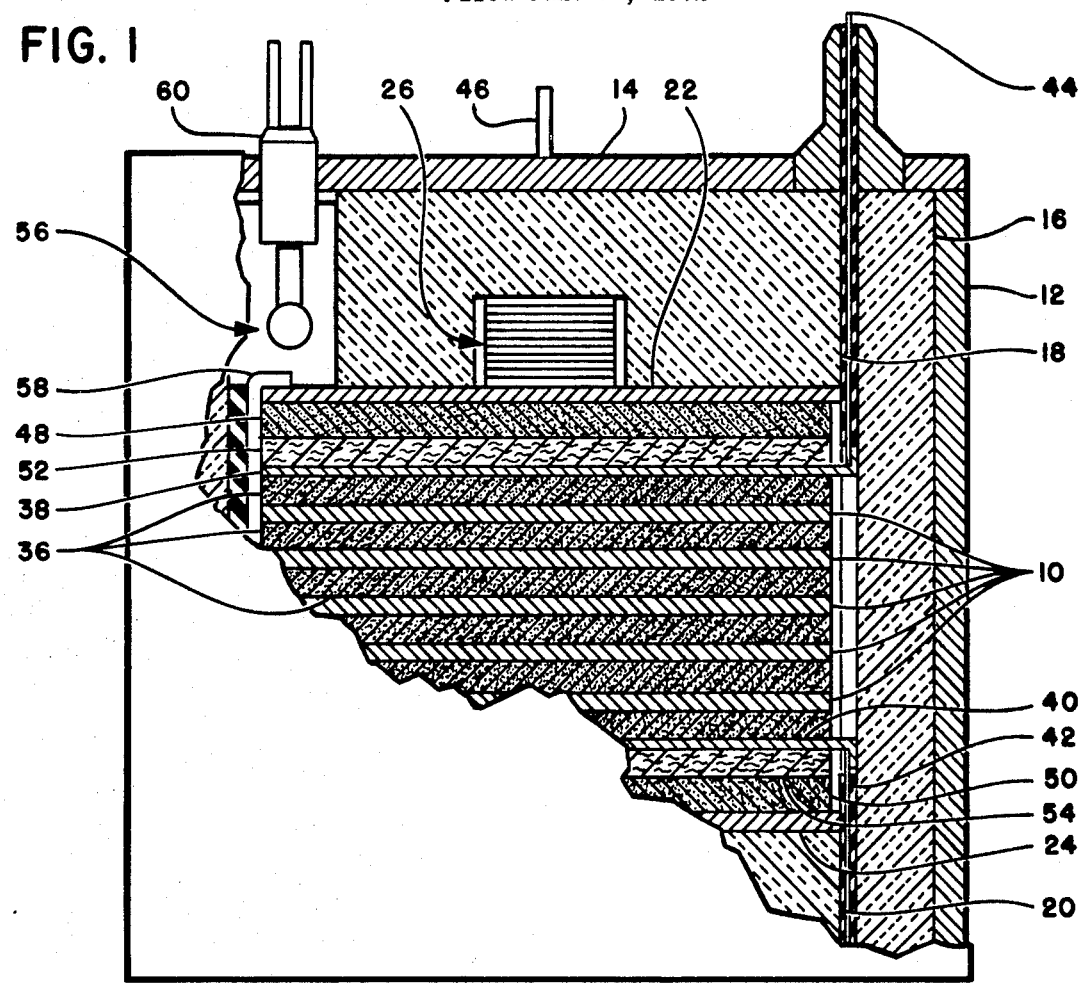
FIG. 1 is a side view partially in cross section of a battery incorporating features of this invention.
Figure 2:
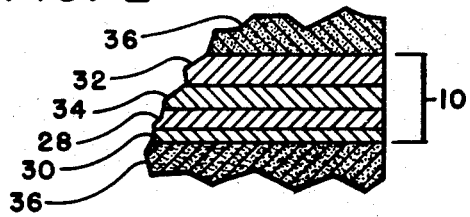
FIG. 2 is an expanded fragmentary view of a portion of a cell stack of the battery of FIG. 1.

Referring to FIGS. 1 and 2, the thermal battery of this invention may include one or more electrochemical cells 10 having cell elements and battery elements stacked in a column within a suitable insulated casing arrangement. The battery is shown in a generally cylindrical configuration with each of the battery cell elements formed as pellets or discs fitted within an appropriate outer tubular or annular casing 12 and cover 14 and a tubular thermal and electrical insulative member 16 and thermal and electrical insulative end members 18 and 20. The battery elements and cell elements may be stacked in appropriate electrical series order and held in position under suitable compressive force by end plates 22 and 24 and an appropriate resilient member 26, for example, a coil spring or bi-metal arrangement.

Casing 12 and cover 14 may be any conventional or appropriately formed members made of metal, plastic, or the like which are compatible with the materials which form the other elements of the battery and with the environment to which it may be subjected. The insulative members 16, 18, and 20 may be made of any appropriate insulation which will provide sufficient thermal insulation at the operating temperatures to maintain the battery cell stack at operating temperature levels for the desired operating life of the battery and which may withstand any environmental conditions to which the battery may be subjected. These members are provided with appropriate recesses and cutouts to receive the various battery parts and elements, as shown in FIG. 1. Particularly appropriate insulative material may be a mixture of submicroscopic pyrogenic silica, quartz fibers and titanium dioxide opacificer with a composition ratio of about 75-9-16% for the respective materials. Such a formation may be mixed and pressed to a nominal density of about 20 pounds per cubic foot with a thermal conductivity of about 0.2 B.t.u.-inch/hr.-ft.$^2$-° F. at a mean temperature of about 260° C. Other apropriate insulated materials having the desired insulation and mechanical properties may be used together with additional layers of thermal and electrical insulation, such as layers made of mica asbestos, which may be wrapped around the battery cell stack, if desired.

Each of the electrochemical cells 10 in the cell stack, as shown in greater detail in FIG. 2, is composed of an active anode or negative electrode 28 and conductive layer or inactive anode 30 separated from an active cathode 32 by a solid electrotlyte pellet 34. Each of the battery cells are separated from each other by a suitable heat generating pellet 36. This basic heating arrangement is repeated for each of the cells. A suitable negative terminal disc 38 and a positive terminal disc 40 may be positioned at appropriate ends of the electrochemical cell stack to collect the electrical energy produced within the cells. An insulated anode terminal lead 42 may be connected between a tab extending from disc 40 and casing 12 while an insulated cathode terminal lead 44 is connected between a tab extending from disc 38 to the exterior of the battery. Each of the leads 42 and 44 may be passed around the periphery of end plates 22 and 24 or through notches therein, as shown. An appropriate pin 46 may be attached to end cover 14 to complete the connection to the battery cells. Anode terminal lead 42 may be coupled, if desired, through an appropriate feedthrough to the exterior of the battery in the same manner as lead 44.

Additional heat generating pellets 48 and 50 may be positioned or stacked at the ends of the electrochemical cell stack adjacent end plates 22 and 24 with buffer or thermal reservoir pellets 52 and 54 sandwiched between the cell stack and heat generating pellets 48 and 50. The heat generating means, that is heat pells 48 and 50 and the heat generating pellets 36 disposed between tthe battery cell 10, may be ignited by a suitable electric match 56 or other ignition device and fuse strip 58. Match 56 may be ignited through an appropriate feedthrough in lead arrangement 60 by a battery (not shown) or other suitable energy source upon command or occurrence of an event.

The heat generating pellets utilized in the battery should be readily ignitable, by the electrically conductive after ignition and produce a minimum of gas during ignition. Other desirable characteristics may include ease of fabrication into pellets, good physical, strength, dimensional stability during ignition, chemical stability, reproducibility, and an appropriate burning rate and thermal output for thermal battery operations. A heat generating material which meets these requirements are mixtures of iron-potassium perchlorate. This material, with a ratio of iron weight percent of from about 84 to 90%, may produce a calorific output of about 180 to 300 calories per gram. At a ratio of 88/12, the calorific output is about 200 calories per gram. The heat generating pellets may be formed by appropriate powder mixing and pelletizing processing. The heat produced by the various heat pellets may be adjusted by changing the weight of heat powder used in the pellets before pressing the powder into pellet form. As can be seen in the embodiment of the battery illustrated in FIG. 1, heat generating pellets 48 and 50 may be thicker than heat generating pellets 36. This arrangement provides a more uniform heat throughout the battery cell stack insuring uniform generation of electrical power therein. All of the heat generating pellets 36 in this embodiment are shown with uniform generation of heat across the cell stack.

The thermal reservoir or buffer pellets 52 and 54 may function by absorbing heat from the heat generating pellets during combustion thereof and releasing the absorbed or stored heat to the cell stack or column when the battery begins to cool after the heat generating pellets have completely burned. For the latter functioning, these thermal reservoir pellets may be made of salts or salt mixtures having a melting point in the temperature range of interest and with a relatively high heat of fusion. In operation, the pellets reduce peak temperatures within the battery when the heat of fusion is absorbed and then release thermal energy as heat of fusion as they freeze. During the freezing period, the temperature of the battery may remain relatively constant, depending on the amount of material used in pellets 52 and 54. It has generally been found that salt mixtures or salt eutectics are preferred over the use of a single salt in order to provide a thermal reservoir pellet having suitable melting and freezing points together with a high heat of fusion at the battery operating temperatures. A typical useable salt eutectic which may be used is that of $NaNO_3$—$LiNO_3$, $CdI_2$—$CsI$, and $AgCl$—$TlBr$.

If it is desired, the buffer pellets 52 and 54 may be relatively inactive materials, such as a thermal insulation described above, which function merely to absorb heat to simulate an additional battery cell to insure uniformity of temperatures throughout the battery cell stack.

In a preferred embodiment of this invention, the active cathode 32 is formed of a halide having a halogen releaseable from the cathode material at temperature above the desired or preselected operating temperature of the battery while the active anode 28 is made of a material which releases electrons and is reactable with the halogen of the cathode material. The electrolyte, which conducts electric current by migration of irons, is a solid at all operating temperatures of the battery and is very poor electrical conductors at room temperature or ambient temperatures of the battery below the desired operating or activation temperature thereof. The solid electrolyte 34 preferably may undergo a phase transition at a temperature no greater than the preselected activation temperature of the battery and may exhibit substantially greater conductivity after the phase transition. Particularly appropriate materials for such battery operation include as a positive or active cathode 32 a polyiodide of either rubidium or cesium, a negative electrode or anode 28 of silver and an electrolyte made of silver iodide.

A silver iodide electrolyte undergoes a phase transformation at about 148° C. from the poorly conducted body centered cubic (beta) form to the highly conducting face centered cubic (alpha) form. The conductivity may vary by factor of $10^4$ from the poorly conducting to the highly conducting form at this temperature phase transition. Any metallic iodide of different valence than silver whose ionic radius is within 10 to 15% of silver, may be added to the silver iodide electrolyte to vary the conductivity of the silver iodide and, in many instances, shift the beta to alpha phase transition temperature. For example, the addition of about 10% by weight of cesium or lead iodide to silver iodide may decrease the phase transition temperature to about 120° C. The addition of more or less of these iodide additives may vary the phase transition to still other temperature levels. Other phase transition temperatures may be provided by selecting appropriate metal salt and metal salt mixtures having the desired phase transition-electrical conductivity characteristics, with varying levels of conductivity, depending upon the desired operating characteristics of the battery, such as cadmium iodide-potassium iodide at 1/2 weight ratios with a phase transition at about 200° C., lithium bromide or magnesium bromide.

Figure 3:
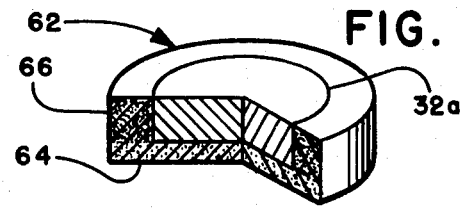
FIG. 3 is an enlarged partially cutaway perspective view of a typical cathode usable in the cells of FIGS. 1 and 2.

The active cathode 32, as stated above, may be a polyiodide of either rubidium or cesium, such as $RbI_3$ or $CsI_4$ or the like, which releases iodine to the battery cell at a temperature at about or above the desired activation temperature of the battery. For example, rubidium triiodide releases iodine in useful and relatively appreciable amounts at temperatures of about 175° C. and above. Since these polyiodides may form partial liquid phases during the release of such iodine and since these liquid phases may react to some extent with the solid electrolyte 34, it is generally desirable to provide an inactive cathode barrier, such as the porous carbon cup electrode 62 shown in FIG. 3, between the active cathode 32a and solid electrolyte 34 to prevent contact therebetween. Porous carbon electrode 62 and active cathode 32a in FIG. 3 may be positioned within the battery cell stack in place of the active cathode 32 shown in FIG. 2. The porous carbon cup electrode 62 may be formed with a barrier layer 64 at a first porosity with a ring barrier 66 at a second and higher porosity than barrier layer 64. Such may be provided by forming layer or plate 64 and ring 66 initially from a carbonizable polyimide foam of different densities which are separately formed and then heat bonded together and carbonized as a unitary member to the porous carbon electrode 62. Barrier layer 64 may have a typical density of about 5 pounds per cubic foot while ring barrier 66 may have a typical density of about 15 pounds per cubic foot. This variation in density between plate 64 and ring 66 permits ready diffusion of iodine from the active cathode 32a to the solid electrolyte 34 while minimizing diffusion of iodine to other portions of the battery cell stack and preventing contact between the active cathode and electrolyte.

The active cathode 32 may be made of other materials which desirably have a negligible vapor pressure at room temperature, which remain solid or substantially solid over the temperature range of interest for the battery and which provide high enough vapor pressure of active halogen, such as iodine, chlorine or bromine, at the activating or operating temperature of the battery to provide the desired high current densities. The inactive anode 30 may be made of a conductive material such as nickel or iron, which is compatible with the other battery materials under battery operating conditions.

The active anode 28 may be made of a silver foil or plate or from pressed silver powder. In order to reduce contact resistance between the electrolyte and the active anode, it is desired that the anode be made from a mixture of silver powder and silver iodide powder, with a silver iodide weight percent of about 10%, compressed into a pellet. It has been found that the contact or interfacial resistance with such a powder mixture may be below about 0.1 ohm, whereas with solid silver the resistance may be from about 1 to 2 ohms.

Figure 4:
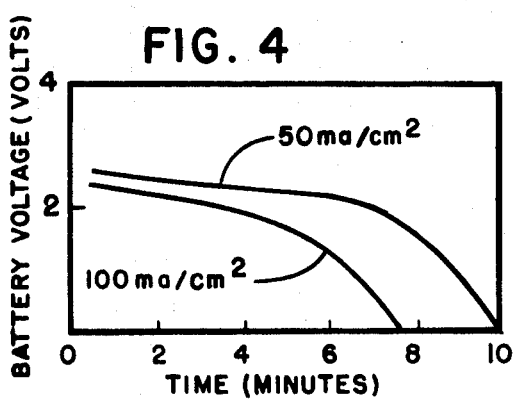
FIG. 4 is a graph showing the voltage produced by the battery of FIG. 1 with 4 cells with a constant current load at 200° C.

A battery was constructed using 4 series connected cells of Ag, AgI/AgI—$CdI_2$/C, $RbI_3$ material combination for the anode, electrolyte and cathode elements with each cell being about 1.9 centimeters in diameter and .75 centimeter thick. The intermediate heat generating pellets 36 of Fe—$KClO_4$ were about .05 centimeter thick while the end heat generating pellets 48 and 50 (Fe—$KClO_4$) were about .1 centimeter thick. The overall battery was about 7.0 centimeters long with a diameter of about 5.4 centimeters. Batteries constructed as described exhibited or produced a voltage vs. time characteristic at 50 and 100 milliamps per square centimeter constant current loads, as illustrated in FIG. 4, at an operating temperature of about 200° C.

Figure 5:
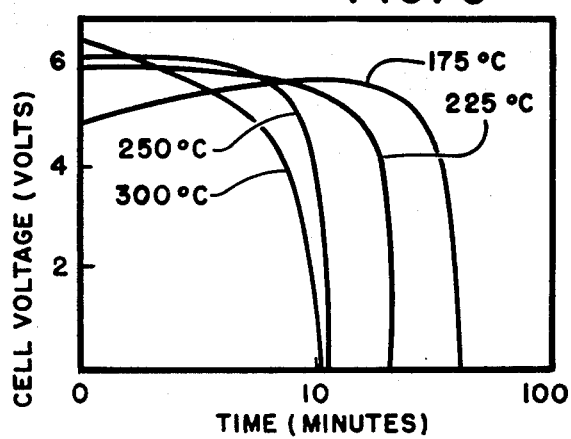
FIG. 5 is a graph of a single cell voltage vs time at a 100 milliamps per square centimeter current drain for various cell operating temperatures.

Individual cells of the same materials and at a diameter of about 1.9 centimeters and volume of about 1.0 cubic centimeter and 2 grams weight were operated at various temperatures and the cell voltage vs. time recorded as a function of current density. These characteristics were measured at current densities of 10, 50, 100 and 150 milliamps per square centimeters at temperatures of 175° C., 225, 250 and 300° C. The results of these measurements at the 100 milliampere per square centimeter current density are illustrated in FIG. 5 at each of these temperatures using a time log scale. It was found that for current densities greater than 50 milliamps per square centimeter, the lower operating temperature of the battery cells should be greater than about 175° C. in order to provide a sufficient supply of electroactive material at the cathode-electrolyte interface. As the operating temperature of the cell is increased, the iodine vapor pressure also increased making it possible for the cell to sustain current densities greater than 50 milliamps per square centimeter. The polarization of the electrodes was found to be negligible even at current densities of about 500 milliamps per square centimeter. The internal resistance of the battery cells was found to be typically about 1 ohm.

What is claimed is:

1. A thermal battery normally inactive at ambient temperatures and self-activatable above a preselected temperature comprising a generally tubular casing; a plurality of stacked electrochemical cells in said casing, each cell including a polyhalide cathode disc having a halogen releaseable from said cathode at temperatures above said preselected temperature, an electrolyte disc solid at operating temperatures of said battery and having a phase transition at a temperature no greater than said preselected temperature with substantially greater electrical conductivity after said phase transition, and an anode disc separated from said cathode disc by said electrolyte disc and reactable to release electrons and reactable with said halogen; disc means in said casing adjacent to and stacked with each of said cells for heating said cells to said preselected temperature; means for conveying electrical energy produced in said cells through said cells and casing; and means for initiatiing said heating means for activating said battery.

2. The battery of claim 1 wherein said cathode disc is selected from the group consisting of the polyhalides of rubidium and cesium.

3. The battery of claim 2 wherein said electrolyte disc is a material selected from the group consisting of silver iodide, silver iodide-cadmium iodide, silver iodide-lead iodide, cadmium iodide-potassium iodide, silver iodide-cesium iodide, lithium bromide and magnesium bromide.

4. The battery of claim 3 wherein said cathode disc includes a gas permeable, electrically conductive barrier between said electrolyte disc and said polyhalide cathode.

5. The battery of claim 4 wherein said gas permeable barrier is a carbon member having a first wall portion interposed between said cathode and said electrolyte and a second wall portion disposed between said cathode and said casing.

6. The battery of claim 5 wherein said first wall portion has greater gas permeability than said second wall portion.

7. The battery of claim 3 wherein said anode disc is a material selected from the group consisting of silver and mixtures of silver with said electrolyte material.

8. The battery of claim 7 wherein said anode disc is a mixture of silver and about 10 weight percent silver iodide, said electrolyte is a mixture of silver iodide and about 20 weight percent cadmium iodide and said cathode is rubidium triiodide.

References Cited

UNITED STATES PATENTS

| 3,476,605 | 11/1969 | Owens | 136—83 R |
|---|---|---|---|
| 3,558,363 | 1/1971 | Franklin | 136—83 T |
| 3,598,654 | 8/1971 | Hruden | 136—83 R |
| 3,575,714 | 4/1971 | Bennett et al. | 136—83 T |
| 3,607,414 | 9/1971 | Kumano et al. | 136—83 T |
| 3,663,299 | 5/1972 | Owens et al. | 136—83 R |
| 3,669,748 | 6/1972 | McCullough et al. | 136—83 T |

ANTHONY SKAPARS, Primary Examiner

U.S. Cl. X.R.

136—153